(12) United States Patent
Kärkkäinen et al.

(10) Patent No.: US 11,880,831 B2
(45) Date of Patent: Jan. 23, 2024

(54) ENCRYPTION SYSTEM, ENCRYPTION KEY WALLET AND METHOD

(71) Applicant: Gurulogic Microsystems Oy, Turku (FI)

(72) Inventors: Tuomas Kärkkäinen, Turku (FI); Ossi Kalevo, Akaa (FI)

(73) Assignee: GURULOGIC MICROSYSTEMS OY, Turku (FI)

( * ) Notice: Subject to any disclaimer, the term of this patent is extended or adjusted under 35 U.S.C. 154(b) by 783 days.

(21) Appl. No.: 15/569,747

(22) PCT Filed: Apr. 27, 2016

(86) PCT No.: PCT/EP2016/025042
§ 371 (c)(1),
(2) Date: Oct. 26, 2017

(87) PCT Pub. No.: WO2016/173724
PCT Pub. Date: Nov. 3, 2016

(65) Prior Publication Data
US 2018/0144341 A1    May 24, 2018

(30) Foreign Application Priority Data
Apr. 27, 2015    (GB) ..................................... 1507154

(51) Int. Cl.
*G06Q 20/38*    (2012.01)
*G06Q 20/02*    (2012.01)
(Continued)

(52) U.S. Cl.
CPC ......... *G06Q 20/3829* (2013.01); *G06Q 20/02* (2013.01); *G06Q 20/382* (2013.01);
(Continued)

(58) Field of Classification Search
CPC ................... G06Q 20/00–425; H04L 9/00–50
See application file for complete search history.

(56) References Cited

U.S. PATENT DOCUMENTS

2002/0141575 A1* 10/2002 Hird ........................ G06F 21/62
713/184
2007/0125838 A1*  6/2007 Law .................... G06Q 20/3223
705/65
(Continued)

FOREIGN PATENT DOCUMENTS

GB          2536299 A     9/2016
JP       2009032003 A     2/2009
(Continued)

OTHER PUBLICATIONS

GB Intellectual Property Office, Examination Report under Section 18(3), Application No. GB1507154.1, dated Jan. 5, 2018, 3 pages.
(Continued)

*Primary Examiner* — Ari Shahabi
(74) *Attorney, Agent, or Firm* — Ziegler IP Law Group

(57) ABSTRACT

An encryption system for encrypting data of a party, wherein the party is provided with an encryption key wallet and one or more encryption keys of the encryption key wallet are identifiable using at least one reference code. The encryption key wallet is opened for accessing an encryption key via its reference code, for encrypting data to generate corresponding encrypted data and/or for decrypting encrypted data to generate corresponding decrypted data, wherein the encryption key is reproducibly generated by the encryption key wallet.
When the encryption system enables exchange of encrypted data via the encryption system between two or more parties the two or more parties are provided with the encryption key wallet;
(Continued)

data exchanged between the parties are encrypted using one or more encryption keys obtained from the encryption key wallet; and the encryption key wallet is opened for use when encrypting and/or decrypting the data exchanged between the parties.

14 Claims, 8 Drawing Sheets

(51) Int. Cl.
*G06Q 20/40* (2012.01)
*H04L 9/08* (2006.01)
*H04L 9/32* (2006.01)

(52) U.S. Cl.
CPC ....... *G06Q 20/4015* (2020.05); *H04L 9/0825* (2013.01); *H04L 9/0861* (2013.01); *H04L 9/0863* (2013.01); *H04L 9/0894* (2013.01); *H04L 9/3226* (2013.01); *H04L 9/3247* (2013.01); *H04L 9/3263* (2013.01); *H04L 9/3268* (2013.01); *H04L 2209/56* (2013.01)

(56) References Cited

U.S. PATENT DOCUMENTS

| | | | |
|---|---|---|---|
| 2009/0034733 A1 | 2/2009 | Raman et al. | |
| 2009/0125429 A1* | 5/2009 | Takayama | G06Q 20/327 705/35 |
| 2011/0271279 A1 | 11/2011 | Pate | |
| 2011/0276495 A1* | 11/2011 | Varadarajan | H04L 63/0838 705/64 |
| 2013/0326233 A1 | 12/2013 | Tolfmans | |
| 2014/0040147 A1* | 2/2014 | Varadarajan | G06Q 20/4016 713/168 |
| 2014/0344957 A1* | 11/2014 | Muller | H04L 63/10 726/30 |
| 2014/0380047 A1* | 12/2014 | Denning | H04L 9/0825 713/168 |
| 2015/0294308 A1* | 10/2015 | Pauker | G06Q 20/02 705/67 |
| 2016/0196553 A1* | 7/2016 | Barhydt | G06Q 20/3829 705/44 |
| 2020/0082387 A1* | 3/2020 | Salama | G06Q 20/3674 |

FOREIGN PATENT DOCUMENTS

| | | | | |
|---|---|---|---|---|
| WO | 9933222 | A1 | 7/1999 | |
| WO | WO-9933222 | A1 * | 7/1999 | ......... G06F 21/6245 |
| WO | 0229557 | A2 | 4/2002 | |
| WO | 2014108182 | A1 | 7/2014 | |
| WO | 2016146269 | A1 | 9/2016 | |

OTHER PUBLICATIONS

GB Intellectual Property Office, Examination Report under Section 18(3), Application No. GB1507154.1, dated Mar. 11, 2019, 3 pages.
European Patent Office, Communication under Rule 71(3) EPC, Intention to grant, Application No. 16719776.3, dated May 4, 2020, 5 pages.
"Diffie-Hellman key exchange." Wikipedia the free Encyclopedia. Page last edited on Sep. 26, 2017, Retrieved at https://en.wikipedia.org/wiki/Diffie%E2%80%93Hellman_key_exchange, 10 pages.
"Encoder" Wikipedia the free Encyclopedia. Page last edited on Sep. 2, 2017, Retrieved at https://en.wikipedia.org/wiki/Encoder, 2 pages.
"RSA (cryptosystem)" Wikipedia the free Encyclopedia. Page last edited Sep. 26, 2017, Retrieved at https://en.wikipedia.org/wiki/RSA_(cryptosystem), 16 pages.
"Pretty Good Privacy" Wikipedia the free Encyclopedia. Page last edited Sep. 22, 2017, Retrieved at https://en.wikipedia.org/wiki/Pretty_Good_Privacy, 10 pages.
"Public-key cryptography" Wikipedia the free Encyclopedia. Page last edited Sep. 17, 2017, Retrieved at https://en.wikipedia.org/wiki/Public-key_cryptography, 14 pages.
"Database Advanced Security Administrator's Guide" Oracle Encryption Wallet, Retrieved on Oct. 3, 2017 at http://docs.oracle.com/cd/B19306_01/network.102/b14268/asotrans.htm#ASOAG600, 17 pages.
UK Intellectual Property Office, Combined Search and Examination Report for Application No. GB1507154.1, dated Nov. 2, 2015, 7 pages.
UK Intellectual Property Office, Examination Report under Section 18(3) for Application No. GB1507154.1, dated Feb. 16, 2017, 6 pages.
International Preliminary Report on Patentability, Application No. PCT/EP2016/025042, dated Apr. 27, 2016, 39 pages.
International Search Report, Application No. PCT/EP2016/025042, dated Aug. 1, 2016, 3 pages.

* cited by examiner

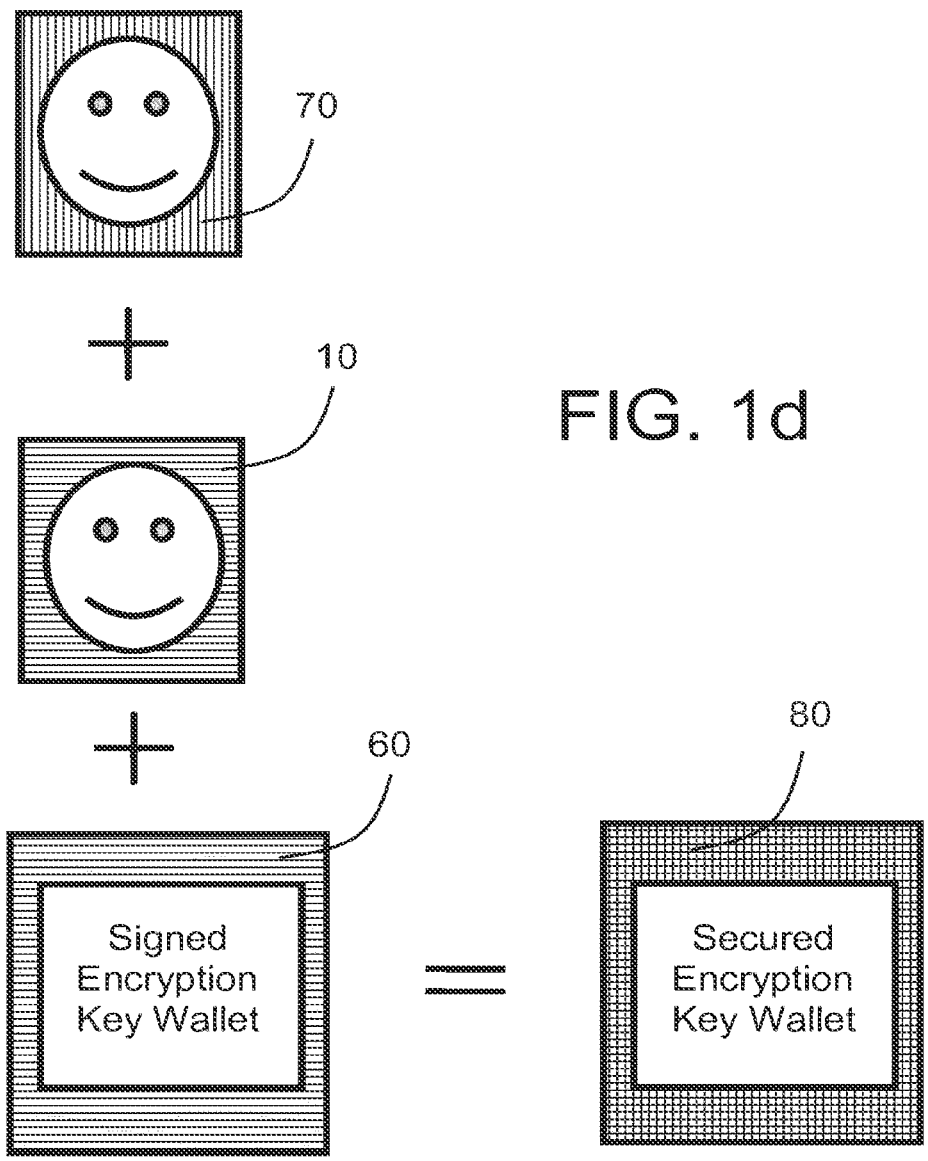

ENCRYPTION SYSTEM, ENCRYPTION KEY WALLET AND METHOD

TECHNICAL FIELD

The present disclosure relates to encryption systems. Moreover, the present disclosure concerns encryption key wallets for use with, for example, aforesaid encryption systems. Furthermore, the present disclosure relates to methods of using aforesaid encryption systems for encrypting data. Yet additionally, the present disclosure is concerned with computer program products comprising a non-transitory computer-readable storage medium having computer-readable instructions stored thereon, the computer-readable instructions being executable by a computerized device comprising processing hardware to execute the aforesaid methods.

BACKGROUND

Encrypting information is necessary in a contemporary information society, both for private citizens as well as for businesses and governmental authorities, because the Internet and other data transfer networks are deeply and permanently integrated into a common infrastructure of the contemporary information society. Therefore, a high degree of reliance is placed upon contemporary information systems, and thus data security of reliable information systems is of utmost important and must not be breached. Thus, it is necessary in the aforementioned contemporary information society to encrypt data that are stored and transceived, so that only authorized parties are able to decrypt and read contents of the data.

In known prior art, in order to increase, for example to maximize, security, encryption keys used to encrypt sensitive data are changed frequently for a real-time transfer channel or for information to be transmitted, for example changes to encryption keys are made every few seconds. Resulting newly created encryption keys are then transmitted with corresponding encrypted information, or alongside it.

During earlier history, various encryption methods for data have been developed along with the development of reading and writing; such encryption methods were mainly used for military purposes. However, especially during the 20th Century, as computers and information networks have become increasingly commonplace, numerous symmetric and asymmetric methods for encrypting data have been developed, of which a most generally known is RSA. RSA (see reference [1]) is a first public key encryption technique. Moreover, RSA was considered to be very strong mathematically, and it initially gave an impression of being unbreakable.

However, later on, when information technology became more commonplace also among regular businesses and average consumers, Pretty Good Privacy (PGP, see reference [2]) was designed. PGP® is very well suited for protecting data files, e-mails and hard-disc drives for storing data. It is generally known that the process of encrypting information functions in such a way that either an entire sequence of information, or a part thereof, is encrypted so that only authorized parties can read it. Encryption makes plain text data into encrypted data by utilizing an encryption key, so that the text data can be read by a recipient only if the encrypted data is decrypted with a correct key that an encrypting party involved has given to the recipient.

It is also generally known that, in theory, it is possible to decrypt encrypted data without a key used for generating the encrypted data, but a long encryption key makes it possible to have more permutations, namely a function fractional (n!), and thus the longer the key is, the more there arises a need for greater computing capacity to break a given encryption of data, which means that it is practically impossible to break a contemporary well-designed cryptosystem implemented with a strong enough encryption key. However, future increases in computing power will eventually make even these well-designed cryptosystems vulnerable to hacking and eavesdropping.

One solution to such need has been provided by an encryption key wallet by Oracle® Inc. (see ref. [4]). In an arrangement proposed by Oracle® Inc., it is specifically encrypted keys that are stored in the encryption key wallet, which requires heavy processing; for example, the encrypted keys need to be decrypted for use. Moreover, such an encryption key wallet is not safe, because data can be used if a given encryption key is decrypted.

The aforementioned encryption key wallet proposed by Oracle® Inc., and its associated encryption system, are potentially very impractical in online data transfers, because both users involved have to request and transmit keys from one wallet via a communication network for each connection session. The Oracle® system is thus clearly intended to be used in local encryption of database elements. That is, the Oracle® system is not intended for data transfers between several parties. Thus, the Oracle® system and other approaches using a database include storing encryption keys in their own security module, which again can be accessed by many different software modules via a large number of API's and frameworks. Even if there were, for example, sixty five thousand keys, and they were changed every two seconds, such a situation is still problematic, as aforementioned. In these known arrangements based on a database, the encryption key wallet is situated in a security module and it is shared by several modules. Even though a regular user who performs a database query has no direct access to the wallet itself in these systems, the wallet is still shared in their information system, and it is in practice only as strong to third party attacks as the information system itself, where the encryption module with its encryption key wallet is located. In the foregoing, it will be appreciated that the Oracle® system is a highly regarded contemporary technology.

There is therefore a need for a more secure solution to be used when encrypting the data, which can also be used in data transfers between parties.

In a published United States patent application US2014040147A1 (Varadarajan Rammohan [US] et al.; "Secure and convenient mobile authentication techniques"), there are described a system, an apparatus, a method, and a computer program product that store two or more encryption keys that correspond to two or more levels of authentication. The encryption keys may be encrypted and decrypted utilizing an endorsement key and trusted computing techniques. Alternatively, the encryption keys may be stored in a secure manner utilizing key protection techniques, such as cryptographic camouflaging. A first encryption key is recovered automatically for the first level of authentication. Moreover, an input is requested to recover the second encryption key for the second level of authentication.

In another published United States patent application US2002141575A1 (Hird Geoffrey R [US]; "Method and apparatus for secure cryptographic key generation, certification and use"), there is described a confidential datum, such as a private key used in public key signature systems, that is secured in a digital wallet using a "generation camouflaging" technique. With this technique, the private key is not necessarily stored in the digital wallet, not even in an encrypted form. Instead, the wallet contains a private key generation function that reproduces the correct private key when the user inputs his or her pre-selected PIN. If the user inputs an incorrect PIN, an incorrect private key is outputted. Such a private key can be configured so that it cannot be readily distinguished from the correct private key through the use of private key formatting, and/or through the use of pseudo-public keys corresponding to the private key. The techniques described herein are also applicable to other forms of regeneratable confidential data besides private keys.

In yet another published PCT document WO9933222A1 (Arcot Systems Inc [US]; "Method and apparatus for safe storage, homologation, and use of encryption keys"), there is described a digital wallet that can store encrypted-access controlled access data, for example a private key encrypted by a given user's personal identification number (PIN), the correct PIN entry allowing decryption of the correct stored key. The entry of certain 'pseudo-correct' PINs also makes it possible to decrypt the stored key, but this occurs in an incorrect manner, which produces a candidate key that cannot be distinguished from the correct key. These pseudo-correct PINs are split into a PIN space, so it is unlikely that the user will enter a PIN that is said to be correct due to a typographical error when entering the correct PIN.

SUMMARY

The present disclosure seeks to provide an encryption system that is more secure than known contemporary encryption systems.

Moreover, the present disclosure seeks to provide an encryption key wallet for use with the aforementioned encryption system.

Furthermore, the present disclosure seeks to provide a decoder for use in the aforementioned system.

In a first aspect, embodiments of the present disclosure provide an encryption system for encrypting data in respect of at least one party, wherein the at least one party is provided with an encryption key wallet, wherein one or more encryption keys of the encryption key wallet are identifiable using at least one reference code, characterized in that the encryption key wallet is opened for accessing at least one encryption key identifiable via its reference code, for encrypting data with an identified key of the encryption key wallet to generate corresponding encrypted data and/or for decrypting encrypted data to generate corresponding decrypted data, and wherein the at least one of the one or more encryption keys is reproducibly generated by the encryption key wallet, and wherein the reference code is delivered along with the encrypted data in an unencrypted manner.

The present disclosure is of advantage in that the encryption system is operable to produce and process encryption keys more efficiently than known conventional encryption systems.

By "reproducibly" is meant that the at least one encryption key is not randomly generated, but rather is generated by using an algorithm that is capable to generating a same given encryption key when the algorithm is provided with a given set of input parameters thereto. By "reproducibly" is thus meant that the at least one encryption key is invariant for the given set of input parameters to the algorithm.

The aforementioned encryption key wallet, in operation, is used for creating a truly reliable information system, namely the encryption system, thereby improving data security that is feasible to be provided to contemporary society. Generation of encryption keys by the encryption key wallet ensures that undesirable or unknown parties cannot access or hamper a given encryption key being used in communication between authorized parties. Thus, the encryption key wallet makes it possible to implement considerably faster and more efficient encryption solutions, yet at least as safe and secure as the known encryption systems, if not even more secure.

Optionally, the at least one party includes two or more parties, and the encryption system is arranged for enabling exchange of encrypted data via the encryption system between the two or more parties, wherein:
(i) the two or more parties are provided with the encryption key wallet;
(ii) data exchanged between the two or more parties are encrypted using one or more encryption keys obtained from the encryption key wallet; and
(iii) the encryption key wallet is opened for use when encrypting and/or decrypting the data exchanged between the two or more parties, and is closed when not in use.

Optionally, in the encryption system, a reference code or other identification of the at least one encryption key, or of an encryption key pair including the at least one encryption key, is transmitted in an unencrypted manner.

Optionally, in the encryption system, the encryption key wallet is able to update a reference code or other identification of one or more encryption keys, or encryption key pairs, being used, so that operation between the two or more parties allows for exchanging the encrypted data in a synchronous manner.

Optionally, in the encryption system, information is exchanged between the two or more parties indicating, via the at least one reference code, a selection of the one or more encryption keys to be used by a recipient party when decrypting the encrypted data received thereat from a transmitting party.

Optionally, in the encryption system, the encryption key wallet is implemented in a form of at least one of: data, one or more algorithms, hardware, a micro circuit, a file.

Optionally, in the encryption system, the encryption key wallet is signed by a private key of a producer of data and/or a transmitter of data, and the encryption key wallet is verifiable by using a public key associated with the private key, wherein the public key and the private key form a public-private key pair.

Optionally, the encryption system is operable to permit access to one or more encryption keys of the encryption key wallet depending upon at least one of:
(i) a spatial and/or geographical location of a recipient party;
(ii) a temporal instant of the recipient party;

Optionally, embodiments of the present disclosure provide an encryption key wallet for use with the encryption system pursuant to the aforementioned first aspect, characterized in that:
(i) the encryption key wallet includes one or more encryption keys that are useable for encrypting data and/or decrypting encrypted data, and are referenced in use by one or more corresponding reference codes; and
(ii) the encryption key wallet is operable to be opened for use, and closed when not in use, wherein the at least one encryption key is reproducibly generated by the encryption key wallet.

Optionally, the encryption key wallet is signed by a private key of a producing party and/or a user, and the one or more encryption keys are accessible and/or verifiable by using a public key corresponding to the private key, wherein the public key and the private key form a public-private key pair.

In a second aspect, embodiments of the present disclosure provide a method of using an encryption system for encrypting data in respect of at least one party, wherein the method includes providing the at least one party with an encryption key wallet, wherein one or more encryption keys of the encryption key wallet are identifiable using at least one reference code,
characterized in that the method further includes opening the encryption key wallet for accessing at least one encryption key identifiable via its reference code, for encrypting data with an identified key of the encryption key wallet to generate corresponding encrypted data and/or for decrypting encrypted data to generate corresponding decrypted data, and wherein the at least one encryption key is reproducibly generated by the encryption key wallet, and wherein the reference code is delivered along with the encrypted data in an unencrypted manner.

Optionally, the at least one part includes two or more parties, and the method is arranged for enabling exchange of encrypted data via the encryption system between the two or more parties. Optionally, in this regard, the method includes:
(i) providing the two or more parties with the encryption key wallet;
(ii) exchanging data between the two or more parties that is encrypted using one or more encryption keys obtained from the encryption key wallet; and
(iii) opening the encryption key wallet for use when encrypting and/or decrypting the data exchanged between the two or more parties, and closing the encryption key wallet when not in use.

Optionally, the method includes transmitting a reference code or other identification of the at least one encryption key, or of an encryption key pair including the at least one encryption key, in an unencrypted manner.

Optionally, the method includes arranging for the encryption key wallet to be able to update a reference code or other identification of one or more encryption keys, or encryption key pairs, being used, so that operation between the two or more parties allows for exchanging the encrypted data in a synchronous manner.

Optionally, the method includes exchanging information between the two or more parties indicating a selection of the one or more encryption keys to be used by a recipient party when decrypting the encrypted data received thereat from a transmitting party.

Optionally, the method includes implementing the encryption key wallet in a form of at least one of: data, one or more algorithms, hardware, a micro circuit, a file.

Optionally, the method includes arranging for the encryption key wallet to be signed by a private key of a producer of data and/or a transmitter of data, and arranging for the encryption key wallet to be verifiable by using a public key associated with the private key, wherein the public key and the private key form a public-private key pair.

Optionally, the method includes operating the encryption system to permit access to one or more encryption keys of the encryption key wallet depending upon at least one of:
(i) a spatial and/or geographical location of a recipient party;
(ii) a temporal instant of the recipient party.

In a third aspect, embodiments of the present disclosure provide an encryption system for encrypting data in respect of at least one party, wherein: the at least one party includes two or more parties, and the encryption system is arranged for enabling exchange of encrypted data via the encryption system between the two or more parties, characterized in that:
(i) the two or more parties are provided with the encryption key wallet;
(ii) data exchanged between the two or more parties are encrypted using one or more encryption keys obtained from the encryption key wallet; and
(iii) the at least one party is provided with an encryption key wallet, wherein one or more encryption keys of the encryption key wallet are identifiable using at least one reference code;
(iv) the encryption key wallet is opened for accessing at least one encryption key between the two or more parties identifiable via its reference code, for encrypting data with an identified key to generate corresponding encrypted data and/or for decrypting encrypted data to generate corresponding decrypted data, and wherein the reference code is delivered along with the encrypted data in an unencrypted manner.

Optionally, in the encryption system, the encryption key wallet is implemented in a form of at least one of: data, one or more algorithms, hardware, a micro circuit, a file.

Optionally, in the encryption system, a reference code or other identification of the at least one encryption key, or of an encryption key pair including the at least one encryption key, is transmitted in an unencrypted manner.

Optionally, in the encryption system, the encryption key wallet is able to update a reference code or other identification of one or more encryption keys, or encryption key pairs, being used, so that operation between the two or more parties allows for exchanging the encrypted data in a synchronous manner.

Optionally, in the encryption system, information is exchanged between the two or more parties indicating, via the at least one reference code, a selection of the one or more encryption keys to be used by a recipient party when decrypting the encrypted data received thereat from a transmitting party.

Optionally, in the encryption system, the encryption key wallet is signed by a private key of a producer of data and/or a transmitter of data, and the encryption key wallet is verifiable by using a public key associated with the private key, wherein the public key and the private key form a public-private key pair.

Optionally, the encryption system is operable to permit access to one or more encryption keys of the encryption key wallet depending upon at least one of:
(i) a spatial and/or geographical location of a recipient party;
(ii) a temporal instant of the recipient party;

Optionally, embodiments of the present disclosure provide an encryption key wallet for use with the encryption system pursuant to the aforementioned fourth aspect, characterized in that:
(i) the encryption key wallet includes one or more encryption keys that are useable for encrypting data and/or decrypting encrypted data, and are referenced in use by one or more corresponding reference codes; and
(ii) the encryption key wallet is operable to be opened for use, and closed when not in use.

Optionally, the encryption key wallet is signed by a private key of a producing party and/or a user, and the one or more encryption keys are accessible and/or verifiable by using a public key corresponding to the private key, wherein the public key and the private key form a public-private key pair.

In a fourth aspect, embodiments of the present disclosure provide a method of using an encryption system for encrypting data in respect of at least one party, wherein the at least one party includes two or more parties, and the method is arranged for enabling exchange of encrypted data via the encryption system between the two or more parties, characterized in that the method includes:
  (i) providing the two or more parties with the encryption key wallet;
  (ii) exchanging data between the two or more parties that is encrypted using one or more encryption keys obtained from the encryption key wallet; and
  (iii) providing the at least one party with an encryption key wallet, wherein one or more encryption keys of the encryption key wallet are identifiable using at least one reference code; and
  (iv) opening the encryption key wallet for accessing at least one encryption key data between the two or more parties identifiable via its reference code, for encrypting data with an identified key of the encryption key wallet to generate corresponding encrypted data and/or for decrypting encrypted data to generate corresponding decrypted data, and wherein the reference code is delivered along with the encrypted data in an unencrypted manner.

Optionally, the method includes implementing the encryption key wallet in a form of at least one of: data, one or more algorithms, hardware, a micro circuit, a file.

Optionally, the method includes transmitting a reference code or other identification of the at least one encryption key, or of an encryption key pair including the at least one encryption key, in an unencrypted manner.

Optionally, the method includes arranging for the encryption key wallet to be able to update a reference code or other identification of one or more encryption keys, or encryption key pairs, being used, so that operation between the two or more parties allows for exchanging the encrypted data in a synchronous manner.

Optionally, the method includes exchanging information between the two or more parties indicating a selection of the one or more encryption keys to be used by a recipient party when decrypting the encrypted data received thereat from a transmitting party.

Optionally, the method includes arranging for the encryption key wallet to be signed by a private key of a producer of data and/or a transmitter of data, and arranging for the encryption key wallet to be verifiable by using a public key associated with the private key, wherein the public key and the private key form a public-private key pair.

Optionally, the method includes operating the encryption system to permit access to one or more encryption keys of the encryption key wallet depending upon at least one of:
  (i) a spatial and/or geographical location of a recipient party;
  (ii) a temporal instant of the recipient party.

Optionally, embodiments of the present disclosure provide a computer program product comprising a non-transitory computer-readable storage medium having computer-readable instructions stored thereon, the computer-readable instructions being executable by a computerized device comprising processing hardware to execute the method pursuant to any one of the aforementioned second aspect or the aforementioned fourth aspect.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and apparatus disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 1b is a schematic illustration of a method of storing the encryption keys from FIG. 1a;

FIG. 1d is a schematic illustration of encrypting an encryption key wallet, pursuant to the present disclosure;

Figure 1A:
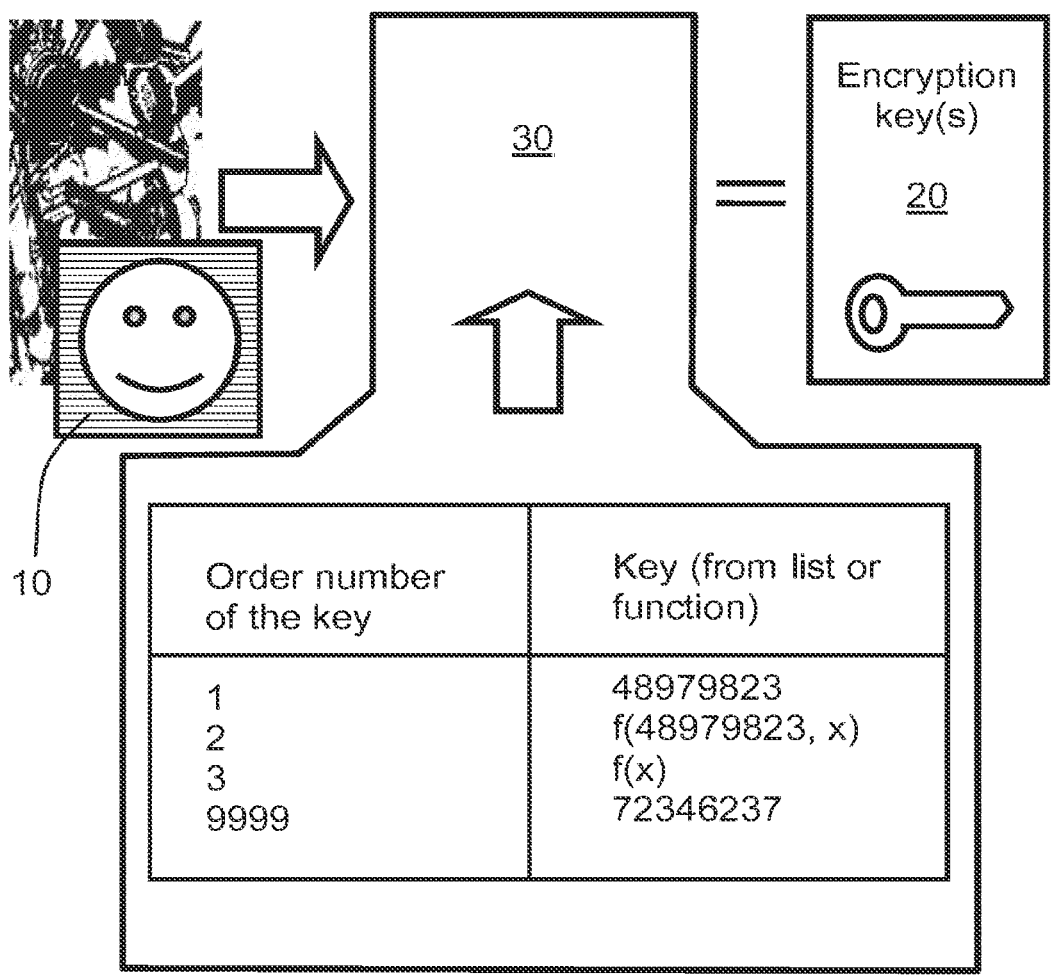
FIG. 1a is a schematic illustration of a method of creating encryption keys within an encryption system pursuant to the present disclosure.

In the accompanying diagrams, an underlined number is employed to represent an item over which the underlined number is positioned or an item to which the underlined number is adjacent. A non-underlined number relates to an item identified by a line linking the non-underlined number to the item.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, embodiments of the present disclosure provide an encryption system for encrypting data in respect of at least one party, characterized in that:
  (i) the at least one party is provided with an encryption key wallet, wherein one or more encryption keys of the encryption key wallet are identifiable using at least one reference code; and
  (ii) the encryption key wallet is opened for accessing at least one encryption key via its reference code, for encrypting data to generate corresponding encrypted data and/or for decrypting encrypted data to generate corresponding decrypted data, wherein the at least one of the one or more encryption keys is reproducibly generated by the encryption key wallet.

It will be appreciated that the at least one encryption key is not always generated in real-time as the encryption key wallet is being used, but it is always generated "a known way" by the encryption key wallet. By "a known way" means that the at least one encryption can be reproducibly generated by the encryption key wallet.

Optionally, the at least one party includes two or more parties, and the encryption system is arranged for enabling exchange of encrypted data via the encryption system between the two or more parties, wherein:
(iii) the two or more parties are provided with the encryption key wallet;
(iv) data exchanged between the two or more parties are encrypted using one or more encryption keys obtained from the encryption key wallet; and
(v) the encryption key wallet is opened for use when encrypting and/or decrypting the data exchanged between the two or more parties.

Optionally, in the encryption system, a reference code or other identification of the at least one encryption key, or of an encryption key pair including the at least one encryption key, is transmitted in an unencrypted manner.

Optionally, in the encryption system, the encryption key wallet is able to update a reference code or other identification of one or more encryption keys, or encryption key pairs, being used, so that operation between the two or more parties allows for exchanging the encrypted data in a synchronous manner.

Optionally, in the encryption system, information is exchanged between the two or more parties indicating, via the at least one reference code, a selection of the one or more encryption keys to be used by a recipient party when decrypting the encrypted data received thereat from a transmitting party.

Optionally, in the encryption system, the encryption key wallet is implemented in a form of at least one of: data, one or more algorithms, hardware, a micro circuit, a file.

Optionally, in the encryption system, the encryption key wallet is signed by a private key of a producer of data and/or a transmitter of data, and the encryption key wallet is verifiable by using a public key associated with the private key, wherein the public key and the private key form a public-private key pair.

Optionally, the encryption system is operable to permit access to one or more encryption keys of the encryption key wallet depending upon at least one of:
(i) a spatial and/or geographical location of a recipient party; and
(ii) a temporal instant of the recipient party.

In a second aspect, embodiments of the present disclosure provide an encryption key wallet for use with the encryption system pursuant to the aforementioned first aspect, characterized in that:
(i) the encryption key wallet includes one or more encryption keys that are useable for encrypting data and/or decrypting encrypted data, and are referenced in use by one or more corresponding reference codes; and
(ii) the encryption key wallet is operable to be opened for use, and closed when not in use.

Optionally, the encryption key wallet is signed by a private key of a producing party and/or a user, and the one or more encryption keys are accessible and/or verifiable by using a public key corresponding to the private key, wherein the public key and the private key form a public-private key pair.

In a third aspect, embodiments of the present disclosure provide a method of using an encryption system for encrypting data in respect of at least one party, characterized in that the method includes:
(i) providing the at least one party with an encryption key wallet, wherein one or more encryption keys of the encryption key wallet are identifiable using at least one reference code; and
(ii) opening the encryption key wallet for accessing at least one encryption key via its reference code, for encrypting data to generate corresponding encrypted data and/or for decrypting encrypted data to generate corresponding decrypted data, wherein the at least one encryption key is reproducibly generated by the encryption key wallet.

Optionally, the at least one party includes two or more parties, and the method is arranged for enabling exchange of encrypted data via the encryption system between the two or more parties. Optionally, in this regard, the method includes:
(iii) providing the two or more parties with the encryption key wallet;
(iv) exchanging data between the two or more parties that is encrypted using one or more encryption keys obtained from the encryption key wallet; and
(v) opening the encryption key wallet for use when encrypting and/or decrypting the data exchanged between the two or more parties.

Optionally, the method includes transmitting a reference code or other identification of the at least one encryption key, or of an encryption key pair including the at least one encryption key, in an unencrypted manner.

Optionally, the method includes arranging for the encryption key wallet to be able to update a reference code or other identification of one or more encryption keys, or encryption key pairs, being used, so that operation between the two or more parties allows for exchanging the encrypted data in a synchronous manner.

Optionally, the method includes exchanging information between the two or more parties indicating a selection of the one or more encryption keys to be used by a recipient party when decrypting the encrypted data received thereat from a transmitting party.

Optionally, the method includes implementing the encryption key wallet in a form of at least one of: data, one or more algorithms, hardware, a micro circuit, a file.

Optionally, the method includes arranging for the encryption key wallet to be signed by a private key of a producer of data and/or a transmitter of data, and arranging for the encryption key wallet to be verifiable by using a public key associated with the private key, wherein the public key and the private key form a public-private key pair.

Optionally, the method includes operating the encryption system to permit access to one or more encryption keys of the encryption key wallet depending upon at least one of:
(i) a spatial and/or geographical location of a recipient party;
(ii) a temporal instant of the recipient party.

In a fourth aspect, embodiments of the present disclosure provide an encryption system for encrypting data in respect of at least one party, wherein:
(i) the at least one party is provided with an encryption key wallet, wherein one or more encryption keys of the encryption key wallet are identifiable using at least one reference code;

(ii) the encryption key wallet is opened for accessing at least one encryption key via its reference code, for encrypting data to generate corresponding encrypted data and/or for decrypting encrypted data to generate corresponding decrypted data, and wherein the encryption system is arranged for enabling exchange of encrypted data via the encryption system between two or more parties, characterized in that:

(iii) the two or more parties are provided with the encryption key wallet;
(iv) data exchanged between the two or more parties are encrypted using one or more encryption keys obtained from the encryption key wallet; and
(v) the encryption key wallet is opened for use when encrypting and/or decrypting the data exchanged between the two or more parties.

Optionally, in the encryption system, the encryption key wallet is implemented in a form of at least one of: data, one or more algorithms, hardware, a micro circuit, a file.

Optionally, in the encryption system, a reference code or other identification of the at least one encryption key, or of an encryption key pair including the at least one encryption key, is transmitted in an unencrypted manner.

Optionally, in the encryption system, the encryption key wallet is able to update a reference code or other identification of one or more encryption keys, or encryption key pairs, being used, so that operation between the two or more parties allows for exchanging the encrypted data in a synchronous manner.

Optionally, in the encryption system, information is exchanged between the two or more parties indicating, via the at least one reference code, a selection of the one or more encryption keys to be used by a recipient party when decrypting the encrypted data received thereat from a transmitting party.

Optionally, in the encryption system, the encryption key wallet is signed by a private key of a producer of data and/or a transmitter of data, and the encryption key wallet is verifiable by using a public key associated with the private key, wherein the public key and the private key form a public-private key pair.

Optionally, the encryption system is operable to permit access to one or more encryption keys of the encryption key wallet depending upon at least one of:

(i) a spatial and/or geographical location of a recipient party; and
(ii) a temporal instant of the recipient party.

In a fifth aspect, embodiments of the present disclosure provide an encryption key wallet for use with the encryption system pursuant to the aforementioned fourth aspect, characterized in that:

(i) the encryption key wallet includes one or more encryption keys that are useable for encrypting data and/or decrypting encrypted data, and are referenced in use by one or more corresponding reference codes; and
(ii) the encryption key wallet is operable to be opened for use, and closed when not in use.

Optionally, the encryption key wallet is signed by a private key of a producing party and/or a user, and the one or more encryption keys are accessible and/or verifiable by using a public key corresponding to the private key, wherein the public key and the private key form a public-private key pair.

In a sixth aspect, embodiments of the present disclosure provide a method of using an encryption system for encrypting data in respect of at least one party, wherein the method includes:

(i) providing the at least one party with an encryption key wallet, wherein one or more encryption keys of the encryption key wallet are identifiable using at least one reference code; and
(ii) opening the encryption key wallet for accessing at least one encryption key via its reference code, for encrypting data to generate corresponding encrypted data and/or for decrypting encrypted data to generate corresponding decrypted data, and wherein the method is arranged for enabling exchange of encrypted data via the encryption system between two or more parties, characterized in that the method includes:

(iii) providing the two or more parties with the encryption key wallet;
(iv) exchanging data between the two or more parties that is encrypted using one or more encryption keys obtained from the encryption key wallet; and
(v) opening the encryption key wallet for use when encrypting and/or decrypting the data exchanged between the two or more parties.

Optionally, the method includes implementing the encryption key wallet in a form of at least one of: data, one or more algorithms, hardware, a micro circuit, a file.

Optionally, the method includes transmitting a reference code or other identification of the at least one encryption key, or of an encryption key pair including the at least one encryption key, in an unencrypted manner.

Optionally, the method includes arranging for the encryption key wallet to be able to update a reference code or other identification of one or more encryption keys, or of encryption key pairs, being used, so that operation between the two or more parties allows for exchanging the encrypted data in a synchronous manner.

Optionally, the method includes exchanging information between the two or more parties indicating a selection of the one or more encryption keys to be used by a recipient party when decrypting the encrypted data received thereat from a transmitting party.

Optionally, the method includes arranging for the encryption key wallet to be signed by a private key of a producer of data and/or a transmitter of data, and arranging for the encryption key wallet to be verifiable by using a public key associated with the private key, wherein the public key and the private key form a public-private key pair.

Optionally, the method includes operating the encryption system to permit access to one or more encryption keys of the encryption key wallet depending upon at least one of:

(i) a spatial and/or geographical location of a recipient party; and
(ii) a temporal instant of the recipient party.

In a seventh aspect, embodiments of the present disclosure provide a computer program product comprising a non-transitory computer-readable storage medium having computer-readable instructions stored thereon, the computer-readable instructions being executable by a computerized device comprising processing hardware to execute the method pursuant to any one of the aforementioned third aspect or the aforementioned sixth aspect.

In overview, a Gurulogic® Encryption Key Wallet is a file or a software application, which is utilized when producing and storing encryption keys used for executing data encryption; for example, the Gurulogic® Encryption Key Wallet is optionally implemented in combination with associated hardware, for example application specific digital circuits, such as ASIC's. Optionally, the Gurulogic® Encryption Key Wallet is also used for encrypting information that is being transmitted between two or more parties, for example two or more parties that are mutually coupled together via a data communication network. The encryption keys produced by the Gurulogic® Encryption Key Wallet make it possible for a given data producer to define a secure and very efficient arrangement for protecting all types of digital information, such as data files, e-mails, audio data, image data, video data, sensor data, biological signal data, genetic readout data, genomic data, forensic data, and so forth. The encryption keys retrieved from the Gurulogic® Encryption Key Wallet do not need to be transmitted between the two or more communicating parties, because the two or more parties using the Encryption Key Wallet know which encryption key has been used to encrypt which particular piece of information, thus establishing a very cost-efficient approach and arrangement for protecting valuable data.

It will be appreciated that the Encryption Key Wallet is also optionally used for encrypting data inside a given device, without any transmission being required with a data producer. In such a case, there is a reference code in the data file and an encryption key in the Encryption Key Wallet. When decrypting the data within the given device, the encryption key according to a next reference code is brought from the Encryption Key Wallet. Thus, the wallet is optionally also utilized at a spatially local level, as one means for encrypting data.

Data encryption systems and associated technology described in the present disclosure makes it possible for a producer of an Encryption Key Wallet to define encryption keys to be produced for the Encryption Key Wallet, and used mutually by two or more communicating parties for data encryption purposes. Optionally, some given producer, for example a service provider, can have a common wallet in use with several consumers and thus, the producer is able to send information simultaneously to many consumers, or else the producer is able to synchronize the number of the used key to inform the users accordingly; in other words, no key needs to be transmitted, but only a reference code of the key to be used, for example when communicating data in a secure manner in embodiments of the present disclosure. Moreover, with the help, for example, of the Gurulogic® Encryption Key Wallet, verification of the data itself or identification of a given data transmitter involved are no longer necessary, and thus a given encryption key being used no longer has to be transmitted with the encrypted data. This is possible, because the encryption keys are previously known to the two or more communicating parties. It will be appreciated that data encryption does not decrease a payload available for the data to be transmitted, when the encryption methods pursuant to the present disclosure are used; it will be appreciated that even if data compression is not a primary purpose for embodiments of the present disclosure, the embodiments are capable of delivering the same data using less data packets than in known encryption arrangements. For these reasons, the Gurulogic® Encryption Key Wallet enables there to be implemented a considerably simpler and faster cryptography method and arrangement that consumes less energy, as compared with known contemporary methods of encrypting data for communication between two or more mutually communicating parties.

When the Gurulogic® Encryption Key Wallet pursuant to the present disclosure is opened, its digital signature must be verified at all times so that not only the integrity of the content is ensured, but also to verify that the content was produced by an authorized party, and that no undesirable or unknown party has tampered with the contents of the Gurulogic® Encryption Key Wallet. Therefore, unlike known contemporary encryption arrangements, the encryption information itself does not need to be digitally signed, when implementing methods pursuant to the present disclosure, because the verification is executed while opening the Gurulogic® Encryption Key Wallet, whereby processing power and time are not wasted unnecessarily when information is being encrypted or decrypted. Such reduction of processing power is especially useful in portable data processing devices, for example smart phones, tablet computers, miniature worn communication devices such as smart watches, and so forth.

Optionally, the Gurulogic® Encryption Key Wallet can remain open during encryption and decryption of data, but it is advantageously closed as soon as its services are no longer required, so that viruses or other malware do not have an opportunity to find out a given encryption key used in encrypting given information. Savings on processing power when methods pursuant to the present disclosure are used are considerable, especially in data transfers where large amounts of data are processed and transceived, such as in video or genome information communication, for example during forensic investigations.

An important advantage gained by using the methods and arrangements pursuant to the present disclosure is that the data size of the information sequence being encrypted does not grow, since a given encryption key that is employed is not transmitted with the encrypted piece of data. This is a considerable improvement in cases, where data to be encrypted is split into smaller sections without making compromises between data security and the data size being transmitted. Examples of this are, among others, instant messaging, e-mails, DNA data communication, packet data communication, sensor data communication, meta-data communication, and so forth.

Optionally, in addition to being used for encrypting content, the encryption keys of the Gurulogic® Encryption Key Wallet can be used, for example, for encrypting transfer channels, but not limited thereto.

It will be appreciated that the Gurulogic® Encryption Key Wallet can also be used without different certificates (for example PKI certificates), when, and if, the verification of the Encryption Key Wallet has been executed in some alternative manner; in the encryption wallet, the aspect of "trust" between a producer of a key and a user of an encryption wallet replaces traditional usage of a certificate. Namely the Encryption Key Wallet is otherwise verifiable, for example using separate pin code between parties or online verification with, for example, a serial number of the Encryption Key Wallet and a Hash value calculated from the content of Encryption Key Wallet. When the Gurulogic® Encryption Key Wallet is used to replace traditional certificates, there are two options for generating it:

(i) two communicating parties can exchange key wallets therebetween, in such a way that one of them generates the encryption key wallet and then transmits it to the other party; they will therefore as a result share the same key wallet (namely, peer-to-peer key wallet generation); or (ii) there is employed a separate server, for example by employing a directory service, wherein the directory service generates the encryption key wallet and then delivers the encryption key wallet to both the communicating parties Regardless of which of these two options (i) and (ii) is selected, usually the traditional encryption model, namely using an encrypted connection, is needed to deliver the key wallet. However, as soon as both communicating parties possess the key wallet, then all encryption is executed using the key wallet, by encrypting the content, without having to use an encrypted connection. Of course, the connection may be encrypted, but it is no longer necessary for ensuring security. In other words, whereas conventional approaches require an encrypted connection, the Gurulogic® Encryption Key Wallet is operable to replace encrypted connections by encrypting the content instead of encrypting the connection.

It will be appreciated that a user may also have several different encryption key wallets for different purposes. Furthermore, a group of users can use a same encryption key wallet with the same serial number for all the members of the group.

In principle, the Gurulogic® Encryption Key Wallets are designed to be used between two communicating parties, but, when required, can be used between more than two communicating parties. The key wallets optionally also have their own individual serial numbers, as aforementioned, wherein it is possible to recognize which particular key wallet is being used. The serial number of a key wallet can be kept separate from the reference codes (namely, key indices) of the keys in the wallet, but they can also be combined if it is so desired. Of course, it is also possible to use the same key wallet for a group of communicating parties, as aforementioned, in which case they share a common secret. Such an approach achieves a similar manner of operation to the Diffie-Hellman key exchange method when communicating between several communicating parties:
https://en.wikipedia.org/wiki/Diffie%E2%80%93Hellman_key_exchange.

However, the encryption system pursuant to the disclosure provides a technical solution for secure data exchange that is not slowed down by the increased count of the parties, namely an operating disadvantage of the aforesaid Diffie-Hellman method. In an example use case, wherein a group of Gurulogic® Encryption Key Wallet users share a same key wallet, all the users in the group are entitled to access the same secret. Therefore, this method is very practical, because there does not need to be several key wallets in a bank, for example, for each individual clients for the group messages (for example, for group e-mails).

The Gurulogic® Encryption Key Wallet can be used cost-efficiently also for protecting a simplex, half-duplex or full-duplex telecommunication connection, where, for example, real-time audio or video streams can be transmitted/received by utilizing encryption keys produced by the Gurulogic® Encryption Key Wallet, thereby not decreasing the payload share available in a given data transfer channel that is employed for communicating the real-time audio or video streams.

The Gurulogic® Encryption Key Wallet superficially resembles a generally known Transaction Authentication Number (TAN) list with which a service provider is able to verify the authenticity of a given person by asking not only the person's user name and pass word, but also Indexed TANs (index-TAN pairs), either regularly or randomly. A hard copy or electronic authentication number list is strong, because it can be used to verify the authenticity of a person since it is bound to the person's user name. However, it cannot be efficiently used to encrypt information, because an Indexed TAN is usually too short for being used as an encryption key. Moreover, on account of a TAN list being static, it cannot be used in a manner akin to the Gurulogic® Encryption Key Wallet mechanism to produce encryption keys, for example if it is intended that a function be used to produce them.

The Gurulogic® Encryption Key Wallet is not restricted to use of one particular encryption algorithm, and thus the encryption keys produced by it can be used both with symmetric and also with asymmetric encryption algorithms. An example pertains to the aforementioned PGP cryptosystem which encrypts data with a disposable or transient encryption key, namely a "Session Key", which is transmitted with the encrypted data, namely asymmetrically encrypted. The Session Key used by PGP can, in its entirety, be replaced by an encryption key produced by the Gurulogic® Encryption Key Wallet, in which case:
    (a) the transient session key is not created;
    (b) it is not protected by asymmetric cryptography; and
    (c) it is not transmitted with the encrypted data.
Encryption methods pursuant to the present disclosure are considerably faster and more cost-efficient to known encryption methods, for example as aforementioned, both as regards computing power and also as regards transfer capacity. The Gurulogic® Encryption Key Wallet defines a mechanism for producing encryption keys which can be used to strengthen an already existing encryption key, or for replacing an encryption key used by a cryptosystem.

By default, as a producer creates or edits an instance of the Gurulogic® Encryption Key Wallet, its contents need to be digitally signed and encrypted using asymmetrical cryptography, with the producer's own private key, against the public keys of other parties involved. This protection of the Gurulogic® Encryption Key Wallet can be implemented for instance by using Public Key Cryptography (PKI, see reference [3]) which achieves a mathematically strongest possible, namely practically unbreakable, protection, using contemporary computing resources.

The producer's own private key must be stored correctly and encrypted with a symmetric cryptography method, such as contemporary AES. The encrypted private key is opened and decrypted, so that it can be used by entering a passphrase determined by the cryptosystem, or some other type of credential such as a finger print or a biological EKG, for example.

In order to achieve enhanced encryption strength, for example maximal encryption strength, it is recommended in embodiments of the present disclosure to use a pass phrase which consists of a person's individual bio-information, because regular methods cannot be used to break them, unlike usual passwords, thereby making it considerably harder to break them. However, methods of data encryption pursuant to the present disclosure are not limited by:
    (a) into which cryptosystem they can be integrated;
    (b) which encryption algorithm is used to protect the Gurulogic® Encryption Key Wallet; or
    (c) in which way the digital signature has been implemented, because the methods pursuant to the present disclosure focus on defined creation and usage of encryption keys.

In addition to being used in data encryption, the Gurulogic® Encryption Key Wallet can be adapted to be used for any passphrases such as:
    (a) a user name of information systems or services, for example with an automatically changing pass phrase;
    (b) for PKI key pairs, for example to encrypt a private key symmetrically;
    (c) in automated online payments via a bank or a credit card company, for example to verify a payment transaction with a payment identification key stored in the Gurulogic® Encryption Key Wallet;

(d) in traditional card payments, for example a given PIN code or a given CVC code of a credit card are defined in the Gurulogic® Encryption Key Wallet;

(e) for identifying a user with an agreed key pair; and (f) in entrances to buildings and rooms, for example the Gurulogic® Encryption Key Wallet holds the entrance codes, for example per GPS spatial location.

The Gurulogic® Encryption Key Wallet can also, in certain situations, be protected in a simpler fashion, by using symmetric cryptography, but in such a case, a given producer must either provide a passphrase or credential with each participant, or negotiate a suitable one with them. Such a passphrase is then used to open the Encryption Key Wallet for use.

The Gurulogic® Encryption Key Wallet can also be created and used in an alternative way, namely in an unencrypted manner, if it is not connected with an information system or device executing the encryption. For example, a user can keep an open Gurulogic® Encryption Key Wallet in his or her cellular phone, for example smart phone. A given server or product, or a selected reference code, can then be used to retrieve encryption keys from the Encryption Key Wallet to encrypt or decrypt data; it will be appreciated that the reference code is optionally received also from the server or the cellular phone itself. If the Gurulogic® Encryption Key Wallet has not been protected with asymmetric cryptography, then the digital signature becomes optional, which means that it can only ensure the integrity of the content, but not an intentional change. Therefore, an unprotected digital signature does not prevent undesirable parties or malware from tampering with the contents of the Gurulogic® Encryption Key Wallet.

The functionality of the Gurulogic® Encryption Key Wallet has two phases:

(i) a creation phase at its creation, which is executed only once per Gurulogic® Encryption Key Wallet, and which is described later with reference to FIGS. 1a, 1b, 1c, 1d, amongst others FIG. 1e; and (ii) a usage phase, namely for data encryption and decryption, which is described later with reference to FIGS. 2a and 2b.

Optionally, along with the data encrypted with the Gurulogic® Encryption Key Wallet, the reference code of the encryption key, or some other type of identification, is transmitted with which it is possible to refer to the key pair and which can be used either automatically or manually. The automatic use of the Gurulogic® Encryption Key Wallet is implemented so that, as a user is proceeding to open the Encryption Key Wallet, it is possible to request a specific key pair by using a pre-defined interface. Optionally, in addition, the serial number of the encryption key wallet is transmitted, so that when a connection is opened, it is known which wallet is to be used. Alternatively, the encryption key wallet to be used can be also determined automatically based upon an identity of the user.

The automatic use of the Gurulogic® Encryption Key Wallet requires that support for it be implemented in the interface being programmed, so as to enable its encryption function. It will be appreciated that, when the Gurulogic® Encryption Key Wallet is used automatically, the interface is allowed to process only such encryption key pairs that were specifically created or defined for it, so that possible malware or corrupted systems or other malicious parties cannot phish for encryption key pairs that have been intended for other usage scenarios or for other parties.

The Gurulogic® Encryption Key Wallet can also be used manually by a legitimate owner of the Encryption Key Wallet who is allowed and able to open the Encryption Key Wallet for use. Simplest examples of such a scenario are a hard-copy TAN list or a key code list in a Gurulogic® Encryption Key Wallet that may reside, for example, in a given user's smart phone. If the Gurulogic® Encryption Key Wallet resides in a user's personal smart phone, then it can be implemented so that when opening a smart phone that is PIN code-protected, finger-print-protected, and so forth, the Gurulogic® Encryption Key Wallet is also opened, either:

(a) entirely for all key pairs; or (b) partly, only for some key pairs.

It will be appreciated that delivering the reference code, or some other type of functionally equivalent identification, for the encryption key to be used is only optional. Namely, the wallet itself can also keep track on the reference code of the last used key, respectively the following key to be used, or the wallet can also randomly choose a reference code of the key and then deliver it along with the encrypted data to the recipient. The keys are not necessary to be used in a specific order, for example they can be selected randomly from a collection of encryption keys. However, as aforementioned, in such a case, the reference code of the key used needs to be delivered along with the data. This decreases the payload; however, a degree of decrease of payload is smaller compared to delivering the encrypted encryption key, due to the length of the reference code being smaller than the length of the encryption key. However, it strengthens the encryption of the data compared to known encryption arrangements, as the information including only the reference code cannot in anyway be used to decrypt the data.

Moreover, opening the Gurulogic® Encryption Key Wallet can also be determined to occur at a certain spatial location or at a certain point in time. In the first case, namely at the certain spatial location, the defined key pairs can be retrieved for use only at a certain geographical location; in such case, the operation protected by the Encryption Key Wallet can be executed only at that certain location. In the latter case, namely at the certain point in time, for example, an automated purchase can be performed only during pre-defined opening hours. Alternatively, in another example case, purchases can be made only in pre-defined shops, or the key pairs needed to open electrical doors and entrance security systems of a user's home can be retrieved from the Encryption Key Wallet, only in an immediate spatial vicinity of the user's home.

To be able to function, the Gurulogic® Encryption Key Wallet requires a device into which it is either embedded as a dedicated microchip, or it is stored as executable software instructions in the memory of the device. Optionally, the Gurulogic® Encryption Key Wallet requires a network connection so that it can access online events. Moreover, optionally, the Gurulogic® Encryption Key Wallet requires access to spatial location data, which access can be implemented with a GPS receiver or an assisted GPS receiver, such an assisted GPS receiver employing spatial location services based on triangulation sensors, with location services based on accelerometers, and so forth.

Occasionally, the Gurulogic® Encryption Key Wallet optionally needs to be able to operate online so that producers can insert new encryption key pairs, edit existing encryption key pairs or delete encryption key pairs. Moreover, via the online access, in case a given device is mislaid or is stolen or abused, the usage of Gurulogic® Encryption Key Wallet can be prevented entirely or partly; furthermore, the producer can terminate the Encryption Key Wallet of the user by removing the user of the Encryption Key Wallet in question from the producer's information system. Moreover, by using spatial location services, it is possible to find the device fast, alternatively yield better protection in cases where the device containing the Encryption Key Wallet in question is lost or stolen; furthermore, the producer can use spatial location data to follow the movements of the device, and based on the location history, the producer can then change verification procedures if necessary, or optionallfry prevent the Gurulogic® Encryption Key Wallet from being used, if it were selected to set up the Encryption Key Wallet accordingly.

An order number (reference code) or other ID of an encryption key or a key pair that has been used from the Gurulogic® Encryption Key Wallet can also be transmitted unencrypted, because the encryption key is protected and known only by the communicating parties. Therefore, knowing the reference code of the encryption key does not jeopardize corresponding information which is encrypted using the encryption key. Optionally, in automatic use of the Gurulogic® Encryption Key Wallet, it is possible for the Encryption Key Wallet to request the reference code or other ID of the encryption keys, or key pairs, being used, so that the operation between parties involved in exchanging encrypted data remains synchronous.

It will be appreciated that the encryption of data in the Gurulogic® Encryption Key Wallet is indeed executed in a synchronous manner, but the usage of reference code or other identification of one or more encryption keys need not be systematic in the option when the reference codes are signaled and transmitted. However, in an optional embodiment wherein the reference codes/key indices/other identification are not signaled, then their usage needs to be systematic, because the key index/reference code being used must not ever be allowed to go out of synchronization between the wallets of communicating parties. In a case where a key wallet exists only in one device, the key indices/reference codes must always be used, because otherwise the user would never be able to open and decrypt data that may have been stored at any point in time previously; the location of the data might be used to express the reference code or other identification that was used as a parameter when generating the encryption key for encrypting the data. Alternatively, the reference code or other identification is stored with the data and it is used when the data decryption key is needed from the Key Wallet.

The encryption keys produced by the Gurulogic® Encryption Key Wallet are advantageously expanded to comply with a given cryptosystem being used, when necessary. Thus, the Encryption Key Wallet does not impose use of any particular encryption algorithm, and therefore it does not alter or compromise a protection or an execution provided by an encryption method being used in the encryption system. The Gurulogic® Encryption Key Wallet optionally also contains encryption key pairs that are used as checksums or hashes, or as identifications (ID's). When used in such a manner, it is possible for the Encryption Key Wallet to produce such items and to replace, for example, the use of a random number generator, if certain encryption key pairs are used in place of produced random numbers, for example in a manner akin to a Session Key of the known PGP® cryptosystem There is next described an example embodiment of the Gurulogic® Encryption Key Wallet, acting as a Directory Service generating one or more Encryption Key Wallets. The embodiment is implemented as a software object that can function independently, either (i) for a data communication network connection; or
(ii) for a separate data streams or separate data of different data types delivered through the network connection.

Separate data streams can be used for different parts of the delivered data. Alternatively, separate data streams can be used for data that is transformed with different transform methods during data compression. Different data types include, for example, audio, video, image, or control data, but are not limited thereto. More information about data types and data streams can be found, for example, from patent applications PCT/EP2016/025024 and GB1504336.7 (Applicant: Gurulogic Microsystems Oy).

The embodiment concerns an implementation that contains, for example, 65535 keys, that are expanded in device memory as the aforesaid software object is instantiated, as follows:

(a) a 128-bit key is expanded to e.g. 352-bit encryption key;
(b) a 192-bit key is expanded to e.g. 432-bit encryption key; and
(c) a 256-bit key is expanded to e.g. 512-bit encryption key.

These encryption keys can then be used in an AES crypto-algorithm employed in the embodiment. Alternatively, keys can be generated based upon a reference code, every time when they are needed. The generated keys can be, for example, from 128-bit key to 512-bit key.

Keys can be acquired from the key wallet in two ways:
(i) automatically, by using the NextKey function: in such a case, a decoder employed is aware of the state of the associated encoder, and thus remains synchronized therewith;
(ii) manually, by selecting a key using a UseKey function (namely, by using a reference code of the key), that is available for streams of a connection that has access for the Gurulogic® Encryption Key Wallet. The implementation described here includes KeyIndex information, namely separately for each stream that is transmitted and delivered inside an MSS packet. The UseKey function is given a KeyIndex as a parameter. This manual way is practical to employ, because the streams in an MSS packet are independent from one another and their synchronization cannot be otherwise guaranteed. The key indices to be used in the UseKey function can be signaled via the data communication network connection or via separate data streams or separate data of different data types as aforementioned. The «key indices» are equal to the term «reference code».

It will be appreciated that the Gurulogic® Encryption Key Wallet is able to utilize existing keys that are previously stored therein. Alternatively, optionally, the Gurulogic® Encryption Key Wallet is able to generate new key for a certain reference code-, each time when it is necessary, using Key Wallets own generation algorithm. The Gurulogic® Encryption Key Wallet is always either generated by one of two or more mutually communicating parties, or else they have been delivered by a party in common with both or all, respectively, of the communicating parties, for example by a server operating as the part in common. The party that generates the key wallet also simultaneously creates/generates the algorithm used for generating the keys and then stores it into the key wallet.

It will be appreciated that the encryption key wallet has a serial number and the key(s) a reference code based on which of the key(s) can be obtained from the wallet.

Additionally, the Gurulogic® Encryption Key Wallet is optionally combined with a GMVC® codec which employs technology designed by Gurulogic® Microsystems Oy, thereby enabling yet stronger encryption keys to be created, namely as described in a published patent document GB2528959 ("Encoder, decoder and method"), which is hereby incorporated by reference. Integrating the Gurulogic® Encryption Key Wallet with methods described in the aforementioned published patent document GB2528959 makes it possible to implement transparently a function which produces an encryption key for a next block of data to be encrypted, thereby preventing malicious parties from reverse engineering such a combined implementation, because a given function that produced the encryption key was retrieved from a protected Gurulogic® Encryption Key Wallet.

It will be appreciated, for the purposes of the present disclosure, an "encoder" is to be considered as a device, a circuit, a transducer, a software program, an algorithm or a person, or any combination of these, that converts information from one format or code to another, for purposes of standardization, speed, secrecy, security or compressions, for example as defined by Wikipedia link: http://en.wikipedia.org/wiki/Encoder.

Next, example embodiments of the present disclosure will be described in greater detail with reference to FIG. 1a to FIG. 2b.

In FIG. 1a, a producer 10, represented by a horizontally striated smiley, creates one or more encryption keys 20 to be used, or defines one or more creation methods for creating such encryption key(s). An encryption key may consist of any bytes, alternatively bits, words, numbers, alphabets, but not limited thereto, and it can have any length. The encryption key can be referred to by employing an order number, denoted by 30. For example, an encryption key can be generated by using a function f(x), or it can be combined with a previous encryption key. The number "x" can be a key reference code of the wallet in question. Alternatively, instead of the number "x" there can be employed several parameters related, for example, to previous keys or their ordinal numbers, seed numbers, the serial numbers of the key wallet or the key reference codes (or key indices), the selected key generation algorithm, a point in time when the generation of keys was executed (with a precision that is usable) and so forth. It will also be appreciated that there might not be any parameter in place of "x"; such a situation arises if the key generation begins, for example, at the serial number zero, and the serial numbers of both the communicating parties are kept synchronized without having to transmit the key reference codes separately. In such a case, the key wallet algorithm maintains information about the current key index (reference code) internally, and it is not given to the generation process as a parameter.

It will also be appreciated that the keys are always generated in some manner, and it is the Gurulogic® encryption key wallet itself that often generates the keys. That is, the Gurulogic® encryption key wallet often does not receive the keys already generated. The generation of the keys may occur at any point in time previously, or they can be generated as they are needed. Only the latter option is valid if the generation of the keys is affected also by the point in time when the key is needed, which is then also the point in time when the key is generated. However, as aforementioned, the Gurulogic® Encryption Key Wallet is able to utilize existing keys previously stored therein, as long as they have been generated in the encryption key wallet or in a context of generating the encryption key wallet.

It will be further appreciated that the one or more keys cannot be generated in a totally random manner, but the one or more keys need always to be the same with the same reference code (unless there are other different parameters employed); in other words, the one or more keys are then "reproducible", namely "invariant". That is, generation of a key needs to be invariable; in other words both key wallets need to generate the same key when using the same reference code and optionally also other similar parameters. Using a random generator is not possible because the keys are not delivered. Only the reference code of key can optionally be delivered. By employing such an approach, the keys do not need to be encrypted, but the wallet generates them in a similar manner in both wallets as long as the reference code, or other parameters employed, are the same. Invariable generated keys can also be used when the Key Wallet is used with only one party to enable that generated keys do not need to be stored. Thus, the keys can be always be generated again when they are needed for data decryption.

Figure 1B:
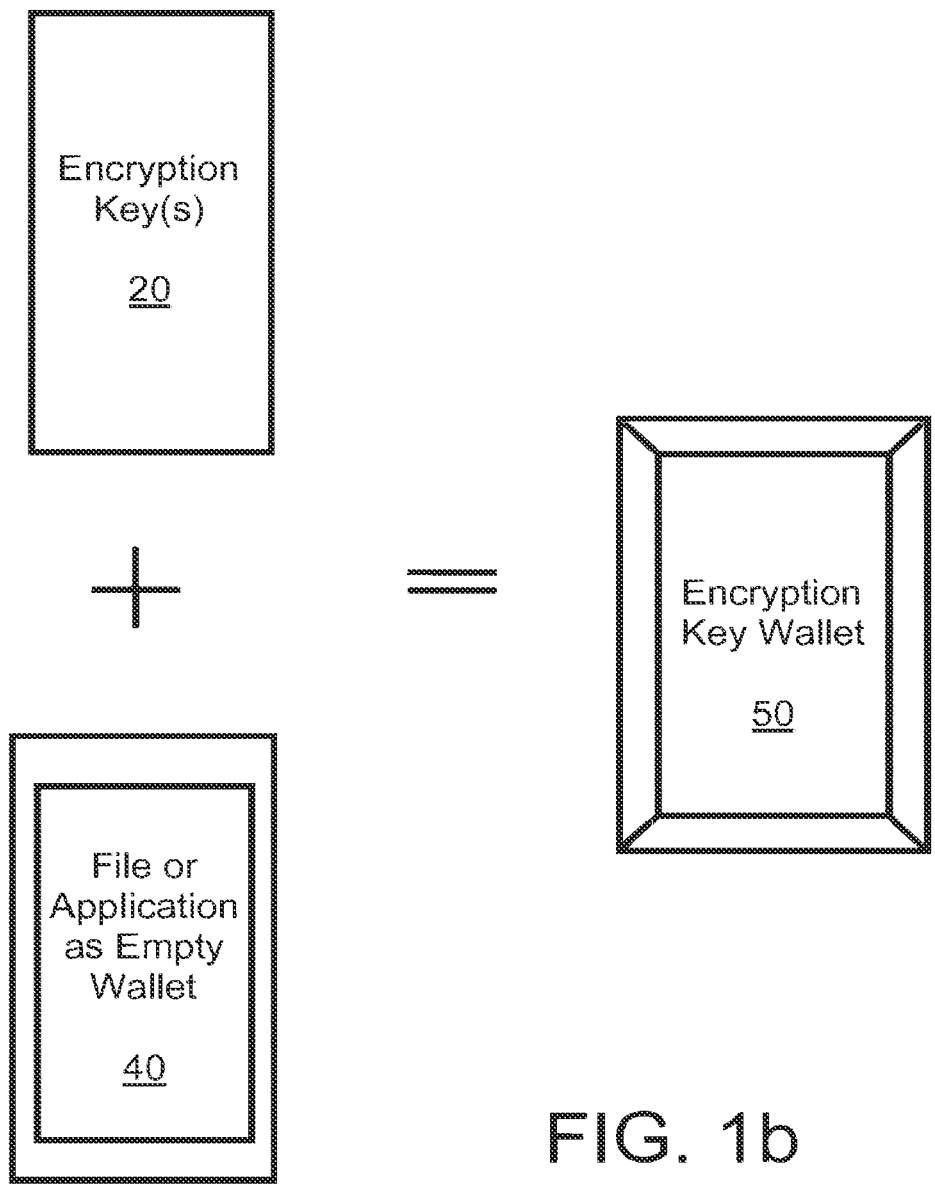

Referring next to FIG. 1b, the producer 10 stores the one or more encryption keys 20 in a file or software application as an empty wallet 40 to generate a Gurulogic® Encryption Key Wallet 50.

Figure 1C:
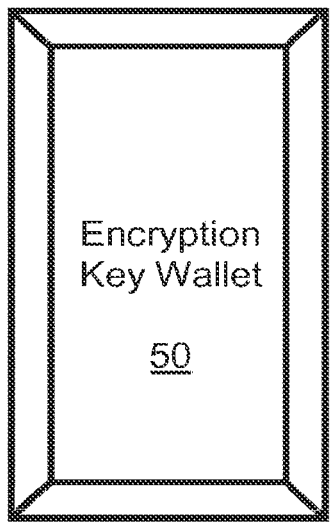
FIG. 1c is a schematic illustration of a process of signing encryption keys pursuant to the present disclosure.
Figure 1C:
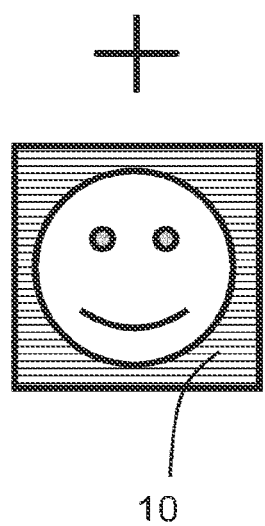
Figure 1C:
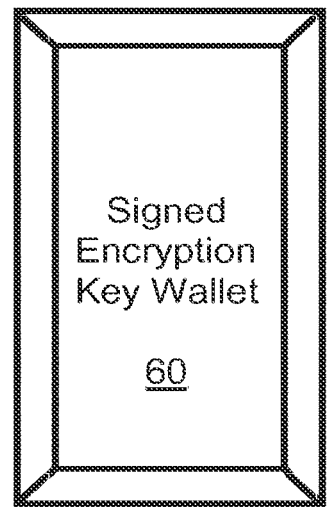

Referring next to FIG. 1c, the producer 10 then digitally signs the Encryption Key Wallet 50 with his or her private key to generate a corresponding digitally signed Encryption Key Wallet 60.

Referring next to FIG. 1d, the producer 10, again represented by a horizontally striated smiley, encrypts the digitally signed Encryption Key Wallet 60 using public keys of both parties, namely the producer 10 and a user 70, wherein the user 70 is represented by a vertically striated smiley. There is thereby generated a secured Encryption Key Wallet 80.

Figure 1E:
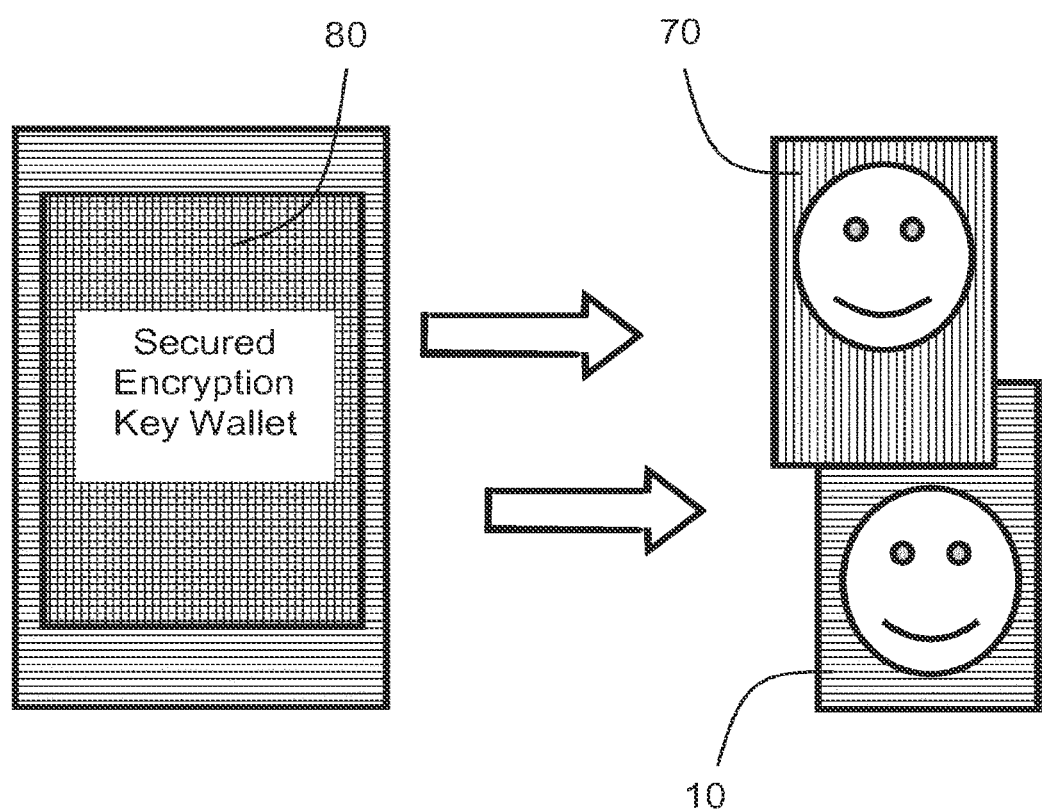
FIG. 1e is a schematic illustration of transmitting a secured encryption key wallet, pursuant to the present disclosure.

Referring next to FIG. 1e, the producer 10 then transmits the secured Encryption Key Wallet 80 to all parties, for example to the producer 10 and to the user 70, and optionally to other users. Optionally, it is also possible not to transmit the Encryption Key Wallet 80, but instead, it is pre-installed in a place of business of the producer, for example at a Hesburger® retail store, certain banks, and so forth. In such cases, it is thereby potentially possible to avoid all those risks that relate to transmission of the Encryption Key Wallet 80 via the Internet or similar type of data communication network, for example, even if this is usually a fastest option for communicating the Encryption Key Wallet 80. Moreover, for example, elderly people potentially may envisage an option of pre-installation as a more convenient way to get the Encryption Key Wallet 80 in use, as they only need to loan their device for a while for installation of the Encryption Key Wallet 80.

Next, a method of encrypting data will be described, with reference to steps of the method which are represented by rectangular features in FIG. 2a; the method is employed, for example in a device of the user 70. It is assumed by default that the producer 10 is included amongst communicating parties; however, the producer 10 can also optionally be a third party who assists the parties in creating and using the Gurulogic® Encryption Key Wallet 80.

Figure 2A:
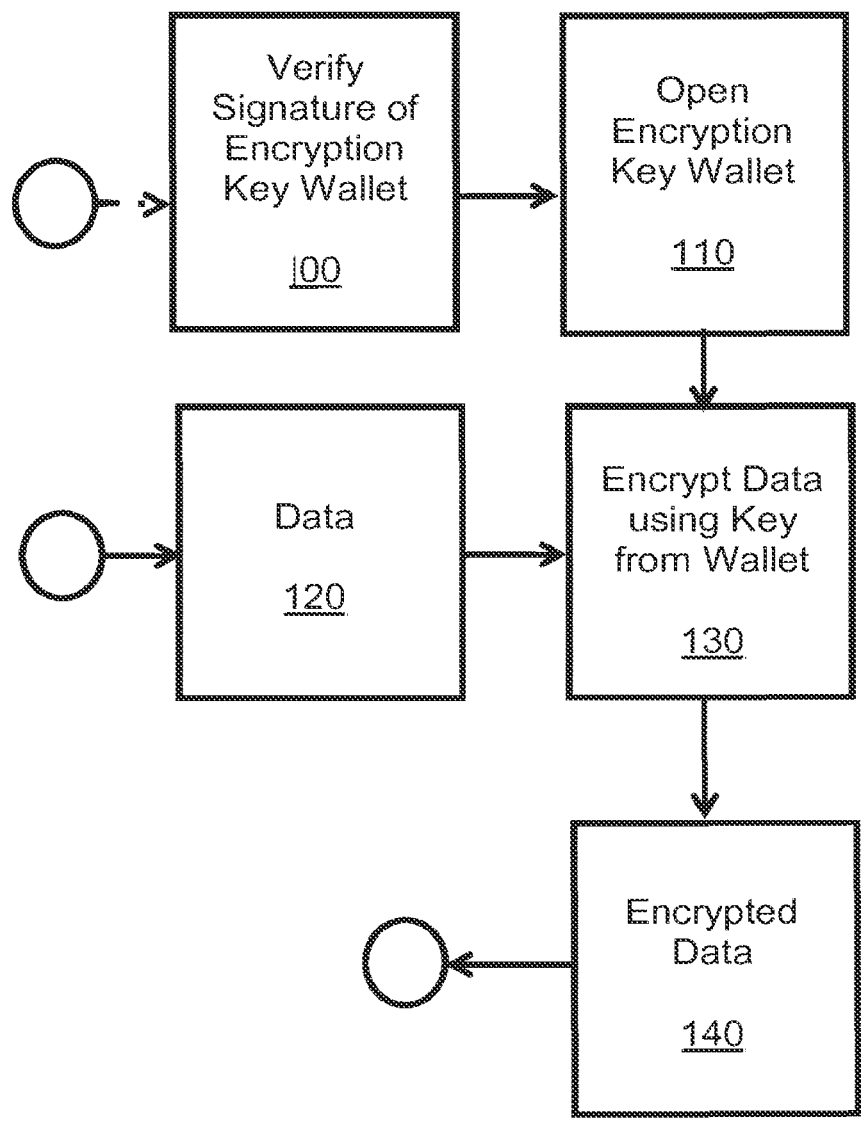
FIG. 2a is a schematic illustration of encrypting data using the encryption key wallet of FIG. 1e.

In FIG. 2a, in steps 100, 110, the parties open the received secured Gurulogic® Encryption Key Wallet 80 by using their own private keys, and then they read or use one of the encryption keys therefrom, which can optionally be expanded if necessary, thereby providing a selected key. The selected key is then used in an encryption step 130 to encrypt data 120 to be transmitted as encrypted data 140, using a defined symmetric encryption method. A digital signature is not needed, because only the communicating parties know the encryption keys that are employed.

Next, a method of decrypting encrypted data, for example generated pursuant to the method of FIG. 2a, will be described with reference to FIG. 2b; the method of decrypting encrypted data is, for example, executed in the device of the user 70, or optionally in devices of other users.

Figure 2B:
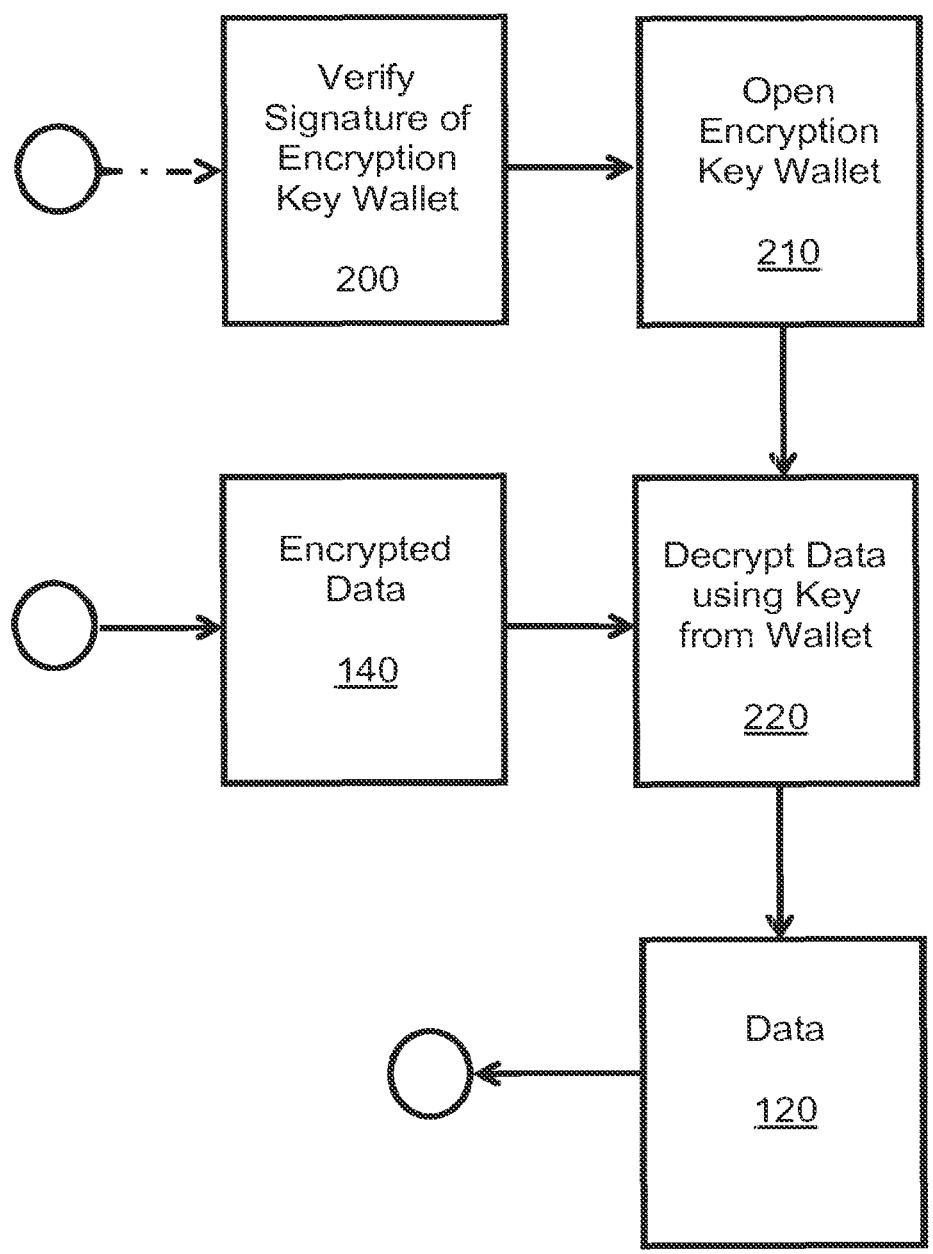
FIG. 2b is a schematic illustration of decryption using the encryption key wallet, wherein there is illustrated a decryption process in a given user's device.
Figure 3:
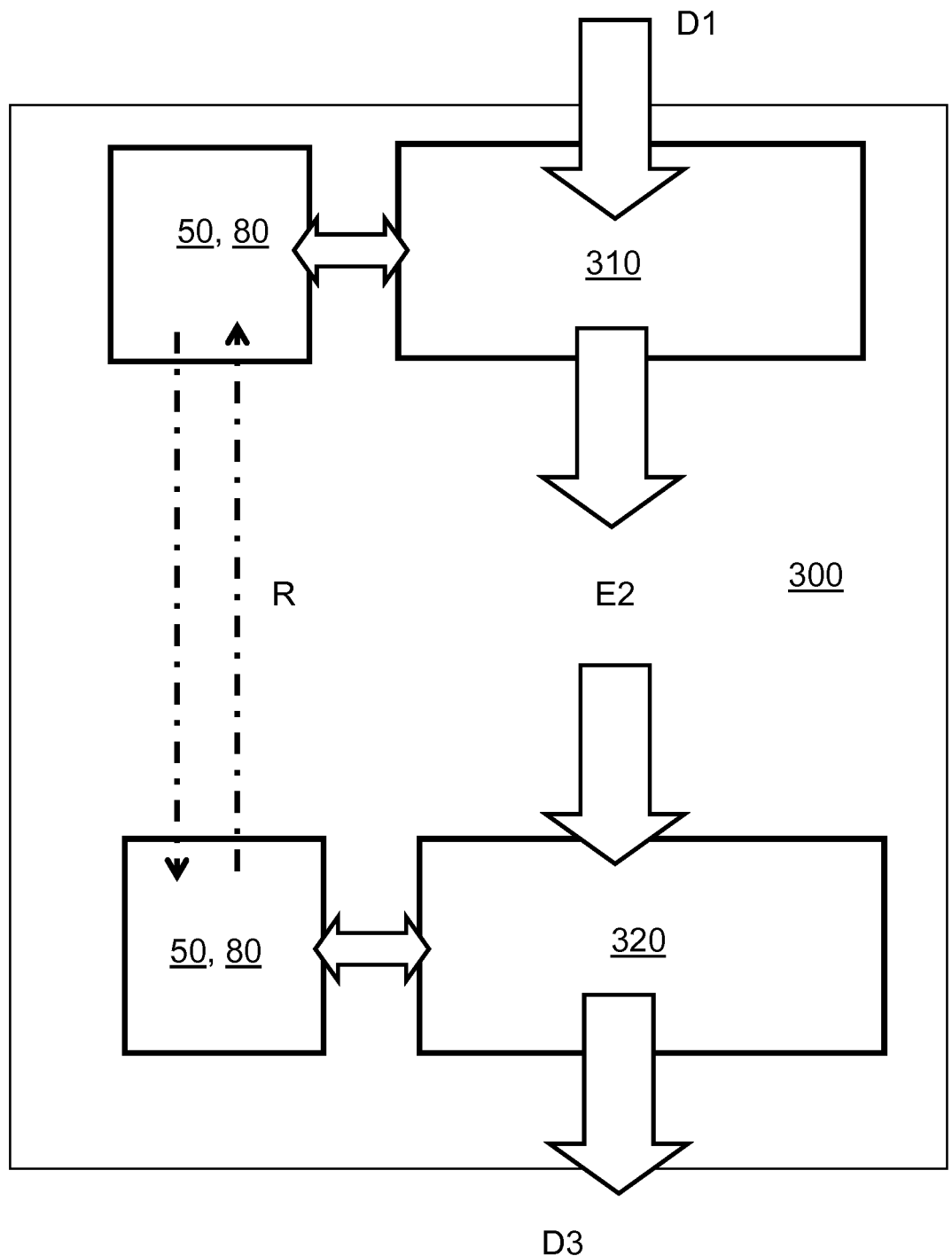

In FIG. 2b, steps of the method of decrypting encrypted data are represented by rectangular features. The received encrypted data 140 is decrypted in a decryption step 220 by the method of decrypting encrypted data which corresponds to an inverse of the encryption method described in the foregoing with reference to FIG. 2a. The secure Gurulogic® Encryption Key Wallet 80 is opened in steps 200, 210 with the user's own private key and by reading or using the referred encryption key, against which the symmetric encryption is decrypted. The encrypted data 140 does not need to be verified, because only the communicating parties can possess and be aware of the used encryption key, whereby not even the identification of the sender needs to be executed, namely used in the decryption method, to implement a step 220 of decrypting the encrypted data 140 to generate corresponding decrypted data 120.

Optionally, in FIG. 2a and FIG. 2b, the encryption keys contained in or generated by the Gurulogic® Encryption Key Wallet 60, 80 can be used to encrypt data between both parties, namely from a given consumer to the producer 10, or optionally from the producer 10 to the given consumer. It will further be appreciated that the encryption keys, in such a case, either can use the same reference code or beneficially different reference codes can be applied for them, so that they will not be unsynchronized if both parties are simultaneously transmitting new data. More optionally, there could even be different encryption keys for the same reference code, depending on which direction the data is transmitted to in respect of the parties.

The encryption system pursuant to the present disclosure is susceptible to being implemented in a wide variety of devices and apparatus, for example:
 (i) smart phones, tablet computers, personal computers, laptop computers, wearable electronic devices;
 (ii) video conferencing systems, security systems, electrical smart grid, medical equipment and apparatus, music delivery system, video delivery systems, telephony systems, financial transaction systems, data communication systems, financial share dealing systems, hedge-fund trading systems, financial derivatives trading platform systems, the Internet, air traffic control systems, geological surveying equipment and apparatus, genomic readout (DNA or RNA readout) equipment and apparatus, video and/or audio distribution systems, video and/or audio replaying devices,
but not limited thereto.

The encryption system pursuant to the present disclosure is highly desirable for situations wherein data of a confidential or sensitive nature is to be exchanged securely between a plurality of parties to the encryption system, wherein it is feasible to communicate encryption key wallet information a priori between the parties before encrypted data is exchanged, or via an independent communication path to that employed for the encrypted data. For example, the encryption key wallet is optionally implemented as a contemporary USB dongle, which can be inserted into USB sockets of tablet computers, laptop computers, personal computers and similar. However, the encryption key wallet is susceptible to being communicated as a data file between the parties to the encryption system. Other implementations of the encryption system are possible pursuant to the present disclosure.

It will be appreciated that embodiments of the present disclosure are optionally implemented using computing hardware which is operable to execute program instructions for implementing methods pursuant to the present disclosure. Alternatively, embodiments of the present disclosure can be implemented, at least in part, in dedicated digital hardware, for example via use of application-specific integrated circuits (ASIC's).

In the foregoing, with regard to the Encryption Key Wallet 80, it will be appreciated that a given reference code can be employed to define a corresponding encryption key in the Encryption Key Wallet 80, and it is the given reference code that is optionally communicated between parties involved when communicating encrypted data therebetween; the parties are provided, for example, a priori with the Encryption key wallet 80. Such an implementation is a single level mapping from the reference code to its corresponding encryption key. However, optionally, it will be appreciated that multiple layers of reference codes can be employed. For example, a first tier reference code communicated between the parties is used to reference a look-up table communicated between the parties a priori to find a second tier reference code which is used to access an encryption key within the Encryption key wallet 80. Optionally, several layers of look-up table are employed; for example, a first tier reference code references a second tier reference code via a first look-up table, and the second tier reference code references a third tier reference code via a second look-up table, wherein the third tier reference code is used to access a relevant corresponding encryption key from the Encryption key wallet 80 for use in decrypting encrypted data. Optionally, the look-up tables are stored at a remote server which is accessible to a plurality of decoders, for example in a multicasting situation; in such a situation, access to the look-up tables stored at the remote server allow control of access to data, for example in a situation of release of a new video production via multicasting to a multitude of mutually spatially dispersed decoders.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim embodiments of the present disclosure are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

We claim:

1. An encryption key wallet system for encrypting and decrypting data, the encryption key wallet system comprising:
 a first computerized device configured to implement a first encryption key wallet, the first computerized device comprising a first hardware processor and a first memory, the first hardware processor configured to:
  open the first encryption key wallet, wherein the first encryption key wallet comprises one or more encryption keys and at least one reference code, and wherein each of the one or more encryption keys corresponds to and is identifiable using one of the at least one reference code;

reproducibly generate at least one encryption key of the one or more encryption keys using a given set of input parameters, wherein the at least one reproducibly generated encryption key is invariant for the given set of input parameters;

randomly select the reproducibly generated at least one encryption key;

generate an encrypted data using the randomly selected at least one encryption key; and transmit the generated encrypted data together with the at least one corresponding reference code of the randomly selected at least one encryption key, wherein the at least one corresponding reference code is transmitted in an unencrypted form.

2. The encryption key wallet system of claim 1, wherein the first encryption key wallet comprises at least one of a data, one or more algorithms, hardware, a micro circuit, and a file.

3. The encryption key wallet system of claim 1, wherein the first hardware processor is further configured to transmit an other identification of the at least one randomly selected encryption key in an unencrypted manner.

4. The encryption key wallet system of claim 1, wherein the encryption key wallet system comprises a second computerized device configured to implement a second encryption key wallet, and the first hardware processor is further configured to cause a synchronous exchange of the encrypted data between the first encryption key wallet and the second encryption key wallet, wherein the synchronous exchange comprises updating the at least one reference code transmitted together with the encrypted data.

5. The encryption key wallet system of claim 4, wherein the first hardware processor is further configured to cause an exchange of information between the first encryption key wallet and the second encryption key wallet, the information being configured to indicate the at least one reference code associated with at least one of the one or more encryption keys for decrypting the encrypted data.

6. The encryption key wallet system of claim 1, wherein the hardware processor is further configured to cause the first encryption key wallet to be signed by a private key of one or more of a producer of the encrypted data, and a transmitter of the encrypted data, and wherein the first encryption key wallet is verified based on a public key associated with the private key.

7. A computer implemented method for exchanging encrypted data between computerized devices of two or more parties, each of the computerized devices comprising a corresponding hardware processor, the method comprising:

providing a corresponding encryption key wallet in each of the computerized devices, each encryption key wallet comprising one or more encryption keys and at least one reference code, each of the one or more encryption keys corresponding to and identifiable using one of the at least one reference code;

opening, by the hardware processor, the encryption key wallet;

reproducibly generating, by the hardware processor via the encryption key wallet, at least one of the one or more encryption keys using a given set of input parameters, wherein the at least one reproducibly generated encryption key is invariant for the given set of input parameters;

randomly selecting, by the hardware processor via the encryption key wallet, the reproducibly generated at least one encryption key;

generating encrypted data by encrypting data, by the hardware processor via the encryption key wallet, using the randomly selected at least one encryption key; and transmitting, by the hardware processor via the encryption key wallet, the encrypted data to a receiving party together with the corresponding at least one reference code of the randomly selected at least one encryption key, wherein the at least one reference code is transmitted in an unencrypted form.

8. The computer implemented method of claim 7, the method further comprises implementing the encryption key wallet in a form of at least one of a data, one or more algorithms, hardware, a micro circuit, or a file.

9. The computer implemented method of claim 7, the method further comprises the hardware processor transmitting an other identification of the at least one encryption key, in an unencrypted form, wherein the at least one encryption key is associated with an encryption key pair.

10. The computer implemented method of claim 7, the method further comprises exchanging the encrypted data between the computerized devices of the respective ones of the two or more parties in a synchronous manner by updating the reference code, by the hardware processor via the encryption key wallet.

11. The computer implemented method of claim 7, the method further comprises exchanging information between the computerized devices of the respective ones of the two or more parties, the information identifying the one or more encryption keys, wherein the one or more encryption keys are configured to be used by a computerized device of a recipient party when decrypting the encrypted data.

12. The computer implemented method of claim 7, the method further comprises signing, by the hardware processor, the encryption key wallet based on a private key of one or more of a producer of data, and a transmitter of data, wherein the private key is associated with a public key forming a public-private key pair.

13. The computer implemented method of claim 7, the method further comprises verifying, by the hardware processor, the encryption key wallet based on a public key associated with a private key of one or more of a producer of data, and a transmitter of data, wherein the public key and the private key form a public-private key pair.

14. A computer program product comprising a non-transitory computer-readable storage medium having stored thereon computer-readable instructions that when executed by a hardware processor are configured to cause the hardware processor to perform the computer implemented method of:

providing an encryption key wallet, the encryption key wallet comprising one or more encryption keys and at least one reference code, each of the one or more encryption keys corresponding to and identifiable using one of the at least one reference code;

opening the encryption key wallet;

reproducibly generating, via the encryption key wallet, at least one of the one or more encryption keys using a given set of input parameters, wherein the at least one reproducibly generated encryption key is invariant for the given set of input parameters;

randomly selecting, via the encryption key wallet, the reproducibly generated at least one encryption key;

generating encrypted data by encrypting data, via the encryption key wallet, using the randomly selected at least one encryption key; and transmitting, via the encryption key wallet, the encrypted data to a receiving party together with the corresponding at least one reference code of the randomly selected at least one encryption key, wherein the at least one reference code is transmitted in an unencrypted form.

\* \* \* \* \*